(12) United States Patent
Kang et al.

(10) Patent No.: US 7,704,382 B2
(45) Date of Patent: Apr. 27, 2010

(54) GRAVITY TYPE FIBER FILTER

(75) Inventors: Young Bae Kang, Gyeongsangnam-do (KR); Gyu Tae Kim, Busan (KR); Tae Gyu Park, Busan (KR)

(73) Assignee: Sungshin Engineering Co., Ltd., Busan (KR)

( * ) Notice: Subject to any disclaimer, the term of this patent is extended or adjusted under 35 U.S.C. 154(b) by 560 days.

(21) Appl. No.: 11/596,195

(22) PCT Filed: May 13, 2005

(86) PCT No.: PCT/KR2005/001415

§ 371 (c)(1),
(2), (4) Date: Nov. 13, 2006

(87) PCT Pub. No.: WO2005/115585

PCT Pub. Date: Dec. 8, 2005

(65) Prior Publication Data

US 2008/0035536 A1 Feb. 14, 2008

(30) Foreign Application Priority Data

May 18, 2004 (TW) ................ 10-2004-0035180

(51) Int. Cl.
*B01D 35/00* (2006.01)
*B01D 24/46* (2006.01)
*B01D 25/00* (2006.01)
*B01D 29/00* (2006.01)

(52) U.S. Cl. .................. 210/86; 210/108; 210/331; 210/333.01; 210/393; 210/408; 210/411; 210/234; 210/237

(58) Field of Classification Search .............. None
See application file for complete search history.

(56) References Cited

U.S. PATENT DOCUMENTS

| 3,502,214 A | * | 3/1970 | Mills et al. ............. 210/136 |
| 3,886,071 A | * | 5/1975 | Weis ..................... 210/108 |
| 4,915,835 A | * | 4/1990 | Barzuza et al. .......... 210/350 |
| 5,354,455 A | * | 10/1994 | Burklund et al. ......... 210/104 |
| 2001/0008219 A1 | * | 7/2001 | Drori .................... 210/411 |

FOREIGN PATENT DOCUMENTS

| JP | 58-205515 A | 11/1983 |
| JP | 12-61211 A | 2/2000 |
| JP | 2000-61211 A | 2/2000 |
| KR | 10-2003-0079862 A | 10/2003 |
| KR | 2003-79862 A | 10/2003 |
| WO | WO-02/068087 A1 | 9/2002 |

* cited by examiner

*Primary Examiner*—Krishnan S Menon
*Assistant Examiner*—Benjamin Kurtz
(74) *Attorney, Agent, or Firm*—Birch, Stewart, Kolasch & Birch, LLP

(57) ABSTRACT

The present invention provides a gravity fiber filter, comprising: a filter tank placed in a portion of a large amount of running water; at least one unit filter disposed in the filter tank; a filtered water collecting tank disposed in a lower portion of the filter tank; a discharging pipe extended from the filtered water collecting tank to the height lower than a influent inlet of the filter tank, so that the height of the extended discharging pipe is defined as a height of starting filtration; a sensor; a air inflow pipe through which a backwash air flows in from outside to a lower portion of the filter tank; a control means controlling the operation of filtering and backwashing; and backwash water discharging pipe.

4 Claims, 5 Drawing Sheets

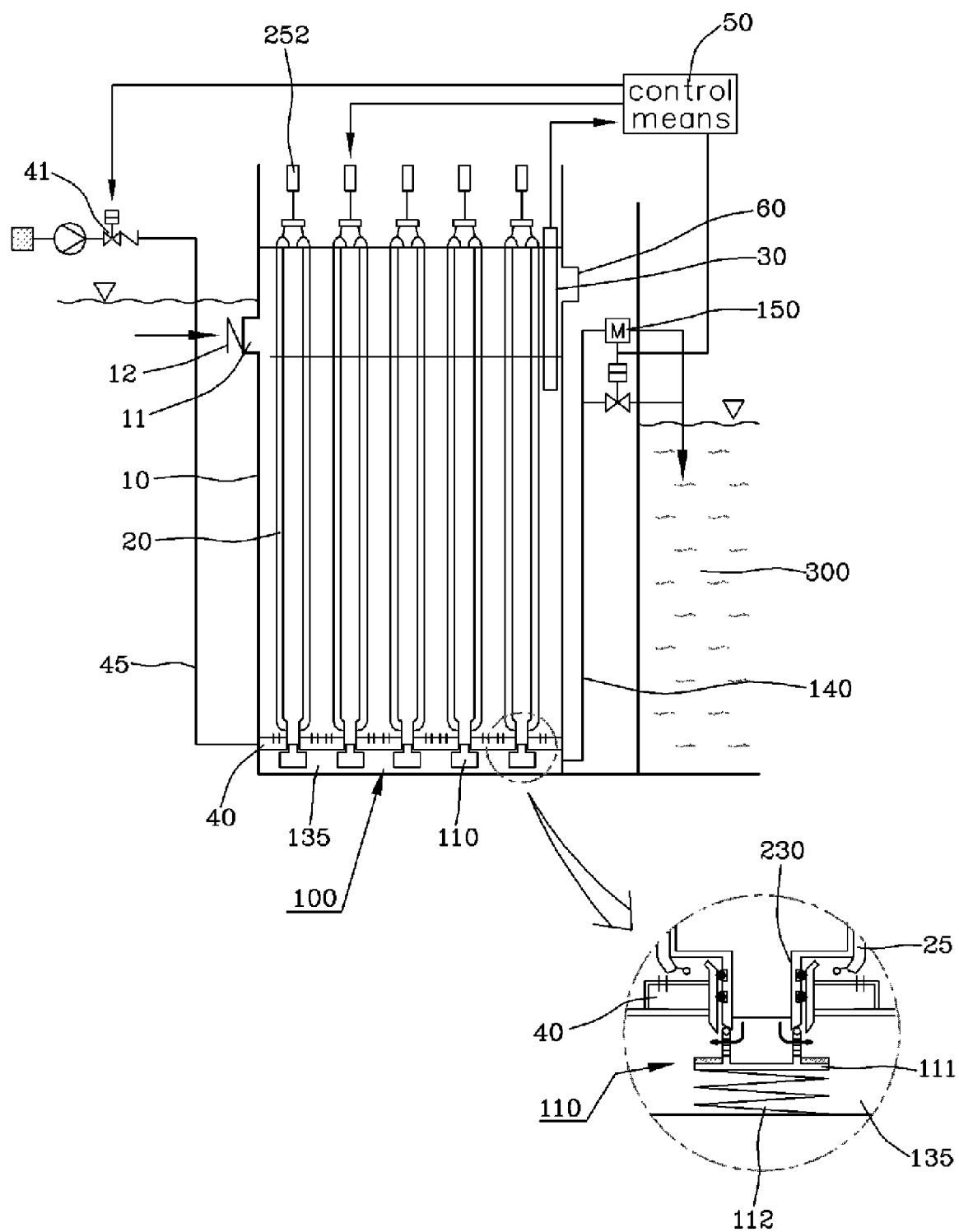
[Fig. 1]

[Fig. 2]
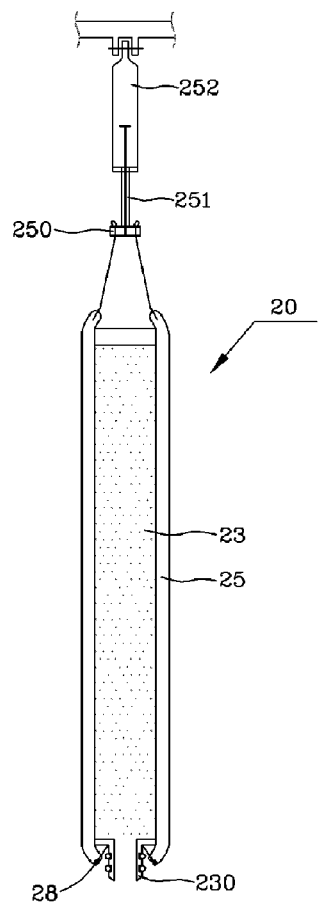
[Fig. 3]
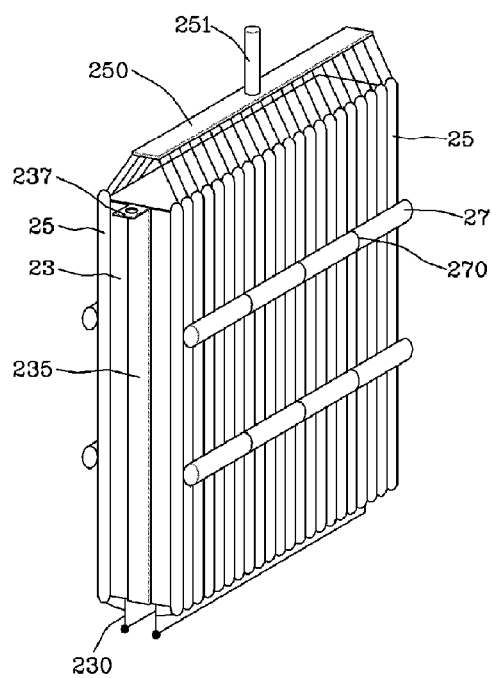

[Fig. 4]
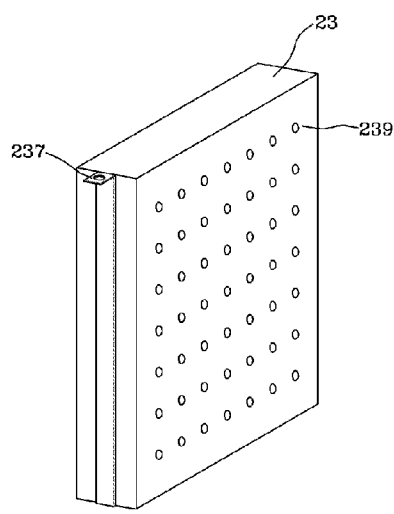
[Fig. 5]
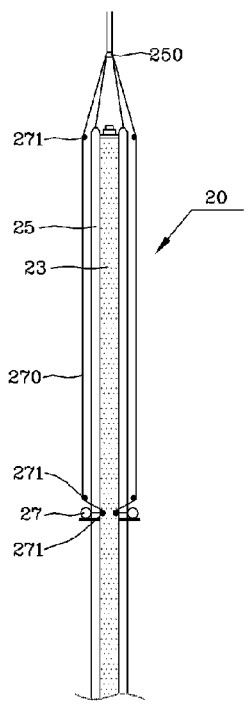
[Fig. 6]
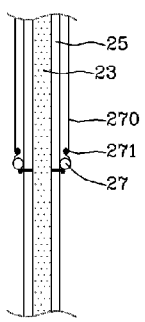

[Fig. 7]
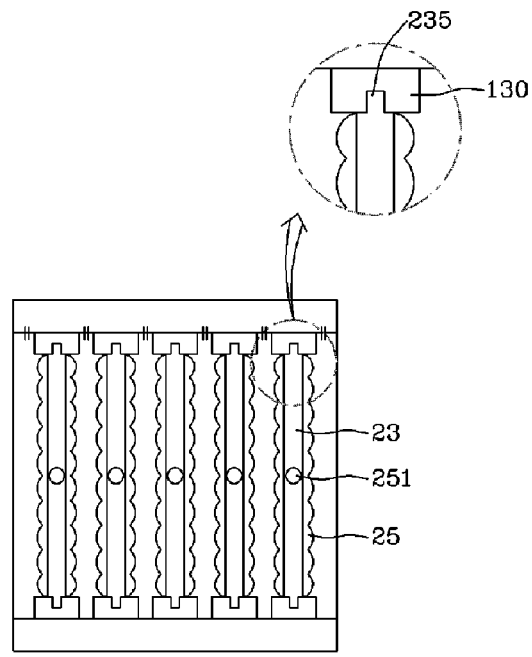
[Fig. 8]
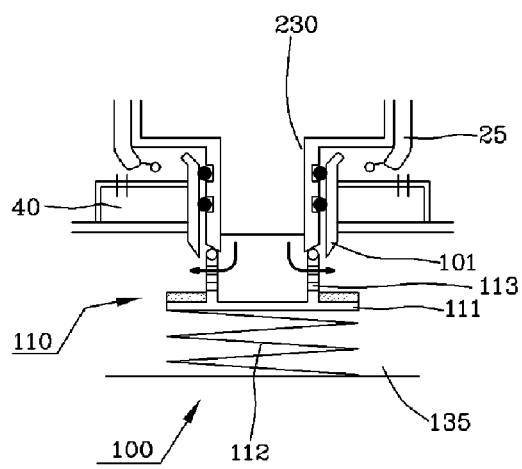
[Fig. 9]
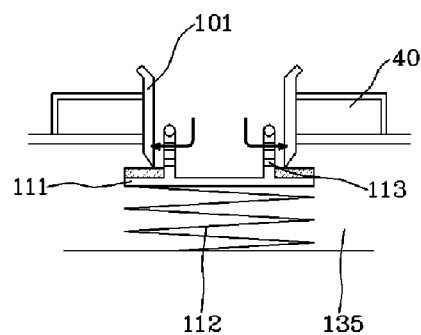

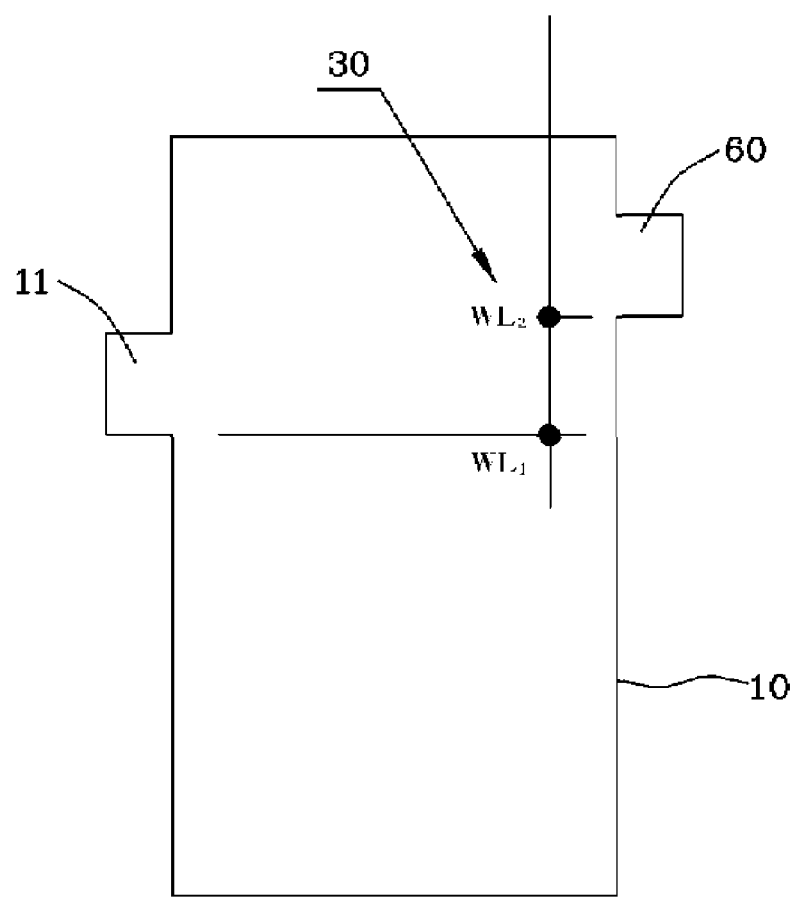
[Fig. 10]

GRAVITY TYPE FIBER FILTER

TECHNICAL FIELD

The present invention relates to a gravity fiber filter, and more specifically a gravity fiber filter comprising: a filter tank placed in a portion of a large amount of running water; at least one unit filter disposed in the filter tank; a filtered water collecting tank disposed in a lower portion of the filter tank; a discharging pipe extended from the filtered water collecting tank to the height lower than a influent inlet of the filter tank, so that the height of the extended discharging pipe is defined as a height of starting filtration; a sensor; a air inflow pipe through which a backwash air flows in from outside to a lower portion of the filter tank; a control means controlling the operation of filtering and backwashing; and backwash water discharging pipe.

BACKGROUND ART

Generally filtering process means a process in which raw water including suspended solids flows into a filter and filtered water is produced by eliminating suspended solids from the raw water. That is, in the filtering process, the suspended solids in the raw water are captured at pores formed in a filtering layer which is formed of filter media by complicated mechanism such as a screening, a precipitation, an inertial collision, an interception, an absorption, cohesion, etc., and thereby clean water, that is, filtered water, is discharged.

As the filtering process is continuously performed, the pores formed in the filtering layer are filled with the suspended solids so that the filtering resistance is increased. When the filtering resistance exceeds a certain degree, the filtering process cannot be performed. At this time, a washing process performed by supplying a clean washing water and air is needed in order to eliminating the suspended solids filling the pores.

Organic and inorganic solids are suspended in the urban sewage and industrial waste water. If the urban sewage and industrial waste water is discharged into the natural waters such as rivers, lakes, marshes, sea, etc, the turbidity of the water is increased and dissolved oxygen is decreased by the organic materials, that is, the natural waters are polluted.

Meanwhile, in the case of filtering the continuously flowing water which needs mass filtering, the filter may be classified into a continuous cross flow gravity filter and a continuous down flow gravity filter or a continuous down flow pressure filter depending on the flow of water.

The continuous cross flow gravity filter includes an Aqua Disk Filter and a Micro Disk Filter. In the Aqua Disk Filter which is an American type, the raw water flows into a water tank by gravity and is filtered by using a carpet type filtering cloth. In the Micro Disk Filter which is a Swedish type, the raw water passes through a close net connected to a variable low-speed rotary center drum from inside to outside and be filtered.

The continuous cross flow gravity filter has advantages as follows. The filtered water has high quality, the filter doesn't need a large site for installation, and it is easy to repair the filter because the filter is manufactured by the respective unit.

But the continuous cross flow gravity filter has disadvantages as follows. It is difficult to cope with the change of the quality or amount of influent raw water, the filtering efficiency is increased but the amount of filtering capacity is decreased if the number of rotation of the rotary drum is decreased or the frequency of washing a disk is decreased, the filter element is damaged by high pressure while washing each disk so that the life of the filter is decreased, and when repairs or replacement of filter media is performed, the operation of filter needs to be stopped.

The continuous down flow gravity filter includes a sand media gravity filter in which raw water flows in to the upper part of a filtering layer, passes through the filtering layer downward and then flows out to a collecting basin placed below. The said filtering layer comprises mainly sand and the life of the filter media is about 5 years.

The sand media gravity filter has advantages as follows. Blockade of the filter media due to mud ball, etc. doesn't occur. And the headloss is small so that filtration by natural flow of water is possible.

The sand media gravity filter has disadvantages as follows. The filter needs a large site for installation, large investment is needed, the growth of algae is hastened by the sun light, the amount of the filter media (i.e., sand) is large so that it is difficult to exchange the filter media, and the operation needs to be stopped in order to exchange the filter.

Therefore, in the filtration of a large amount of continuously flowing water, i.e., discharged waste water, the filter of the prior art still has problems to be improved.

DISCLOSURE OF INVENTION

Technical Problem

Accordingly, the present invention has been made keeping in mind the above problems occurring in the related art, and an object of the present invention is to provide a new type of gravity fiber filter that filters suspended solids in a large amount of continuously flowing water. That is, the object of the present invention is to provide a gravity fiber filter which has the advantages of the said continuous cross flow gravity filter, namely high quality of the filtered water, a small site for installation and easy maintenance, and in which the disadvantages of the said continuous cross flow gravity filter are obviated.

Technical Solution

To achieve these and other advantages and in accordance with the purpose of the present invention, as embodied and broadly described, a gravity fiber filter comprises a filter tank placed in a portion of a large amount of running water, and comprising an influent inlet formed in a side of an upper portion of the filter tank and letting raw water flow in through a check valve, a filtered water collecting tank formed in a lower portion of the filter tank and collecting filtered water, and a backwash water outlet formed in a higher position than the influent inlet; at least one unit filter filtering the raw water which flows into the filter tank, and comprising at least one filtered water outlet protruding from a bottom of the unit filter, the unit filter joined to or separated from the filter tank by joining the filtered water outlet to the filtered water collecting tank or separating the filtered water outlet from the filtered water collecting tank of the filter tank; a sensor detecting a water level in the filter tank and then generating a control signal; an air inflow pipe extended from outside to a bottom portion of the filter tank, so that a backwash air is provided for the unit filter through the air inflow pipe depending on the control signal of the sensor; a control means controlling performing a filtration process, in which the raw water flowing into the water tank is filtered by the unit filter and then discharged into the filtered water collecting tank depending on the control signal of the sensor, and performing a backwash process, in which a backwash air and a backwash water flows into the filter tank simultaneously or sequentially; and a backwash water discharging pipe connected to the backwash water outlet of the filter tank and discharging suspended soils, which are gathered at an upper portion of the filter tank by the operation of the backwash water and the vibration of the backwash air bubbles, to outside.

In the above, the gravity fiber filter may further comprise a lifting device formed in an upper end and lifting each unit filter separately when maintenance or repair is needed.

In the above, the unit filter may comprise a perforated case which has a broad board shape structure having a cavity inside and having at least one filtered water outlet formed on the bottom, and on both sides of which at least one filtered water inflow hole is formed; a fiber filter media being a plurality of bundles of fiber, which are arranged densely on both sides of the perforated case, each lower portion of which is connected and fixed to a lower filter media holder connected to a lower portion of the perforated case, and each upper portion of which is connected to an upper filter media holder placed horizontally and separately above the perforated case; a piston rod connected to the upper filter media holder; and a cylinder, which controls the ascent and descent of the upper filter media holder by operating the piston rod so that the size of pores of the fiber filter media is controlled when filtering and backwashing is performed.

In the above, the unit filter may further comprise a compression bar disposed horizontally on an outside of the fiber filter media; a support bar disposed horizontally on both sides of the perforated case; and a support string supported by the support bar and connecting the compression bar with the upper filter media holder, wherein if the upper filter media holder ascends or descends by the operation of the cylinder, the compression bar tightens or loosens the fiber filter media, so that the pore size of the fiber filter media can be controlled successfully in a middle portion of the fiber filter media as well as in both end portions of the fiber filter media.

In the above, the filtered water collecting tank may comprise at least one discharging guide which is a guiding pipe formed in an upper portion of the filtered water collecting tank, the filtered water outlet of the unit filter guided into the discharging guide; and a discharging pipe connected to a side of the filtered water collecting tank and guiding the collected filtered water to an outside water tank.

In the above, the filtered water collecting tank may further comprise a drainage check valve which has a cylindrical shape, on an outer surface of which at least one hole is formed, and which enters and coming out of the discharging guide by elasticity of an elastic body, wherein when the unit filter is combined, the unit filter descends and contacts closely to the filtered water collecting tank by the weight of the unit filter so that the filtered water is discharged into the filtered water collecting tank through the hole formed on an outer surface of the drainage check valve, and when the unit filter ascends and is separated by the cylinder, the drainage check valve ascends by the elasticity of an elastic body and inserted into the discharging guide so that the drainage check valve blocks the discharging guide.

In the above, the gravity fiber filter may further comprise a guiding groove formed on an inside of both sides of the filter tank; and a sliding connection means which is formed on both narrow sides of the unit filter and slides along the guiding groove, wherein the operation of an ascending and descending of the unit filter is performed along the guiding groove so that the filtered water outlet formed on a bottom of the unit filter is connected perfectly to the filtered water collecting tank.

In another aspect, the unit filter may comprise a perforated case which has a cylindrical shape structure having a cavity inside and having at least one filtered water outlet formed on the bottom, and on an outer surface which at least one filtered water inflow hole is formed; a fiber filter media being a plurality of bundles of fiber, which are arranged densely on an outside of the perforated case, each lower portion of which is connected and fixed to a lower filter media holder connected to a lower portion of the perforated case, and each upper portion of which is connected to an upper filter media holder placed separately above the perforated case; a piston rod connected to the upper filter media holder; and a cylinder, which controls the ascent and descent of the upper filter media holder by operating the piston rod so that the size of pores of the fiber filter media is controlled when filtering and backwashing is performed.

ADVANTAGEOUS EFFECT

According to the present invention, new type of a gravity fiber filter which blocks a portion of the continuous water flow and filters the water is provided.

Because each unit filter is manufactured separately, it is easy to maintain and repair the filter.

The unit filter can be exchanged without removing the water.

When discharged water does not meet the standard for the discharged water or needs to be recycled after processing the waste water, etc., a filtration eliminating solid materials is performed. Because the gravity fiber filter of the present invention performs filtration depending on the difference of the water level, pumping the discharged water is not needed. Accordingly, the gravity fiber filter of the present invention can reduce the maintenance expenses due to reduction of the expenses for electric power. For example, pumping power of the sewage treatment plant of 100,000 $m^3$/day is about 220 kw, thus the expenses for the electric power is about 100,000 dollars a year. But the gravity fiber filter of the present invention can reduce such expenses.

DESCRIPTION OF DRAWINGS

The above and other objects, features and other advantages of the present invention will be more clearly understood from the following detailed description taken in conjunction with the accompanying drawings, in which:

FIG. 1 is illustrating a structure of a gravity fiber filter of the present invention;

FIG. 2 is a cross-sectional view of a unit filter of a gravity fiber filter of the present invention;

FIG. 3 is a perspective view of a unit filter of a gravity fiber filter of the present invention;

FIG. 4 is a perspective view of a perforated case of a unit filter of a gravity fiber filter of the present invention;

FIG. 5 is illustrating an embodiment of a unit filter of a gravity fiber filter of the present invention;

FIG. 6 is illustrating another embodiment of a unit filter of a gravity fiber filter of the present invention;

FIG. 7 is a plan view of a gravity fiber filter of the present invention;

FIG. 8 is illustrating a filtered water collecting tank to which a unit filter is connected;

FIG. 9 is illustrating a filtered water collecting tank from which a unit filter is removed; and FIG. 10 is illustrating an operation of a sensor of a gravity fiber filter of the present invention.

MODE FOR INVENTION

Hereinafter, preferred embodiments of the present invention will be described in detail with reference to the attached drawings. In description, if the detailed description about the related prior arts and construction thereof is considered that it confuses the subject matter of the invention, the description will be omitted. The following terminologies are defined by considering the functions in the present invention, which are subject to change in accordance with the intention of users or operators, or the conventions. Therefore, the definition of the terminologies should be construed based upon the whole contents of the specification describing a gravity fiber filter.

FIG. 1 is illustrating a structure of a gravity fiber filter of the present invention, FIG. 2 is a cross-sectional view of a unit filter of a gravity fiber filter of the present invention, FIG. 3 is a perspective view of a unit filter of a gravity fiber filter of the present invention, FIG. 4 is a perspective view of a perforated case of a unit filter of a gravity fiber filter of the present invention, FIG. 5 is illustrating an embodiment of a unit filter of a gravity fiber filter of the present invention, FIG. 6 is illustrating another embodiment of a unit filter of a gravity fiber filter of the present invention, FIG. 7 is a plan view of a gravity fiber filter of the present invention, FIG. 8 is illustrating a filtered water collecting tank to which a unit filter is connected, FIG. 9. is illustrating a filtered water collecting tank from which a unit filter is removed, and FIG. 10 is illustrating an operation of a sensor of a gravity fiber filter of the present invention.

The present invention is a filtering device which is disposed in a continuous water flow and filters the continuously flowing water. As shown in the figures, The present invention comprises a filter tank 10, at least one unit filter 20, a sensor 30, an air inflow pipe 40, control means 50, and backwash water discharging pipe 60.

And the gravity fiber filter of the present invention further comprises lifting device (not shown in the figure). The unit filter 20 comprises a perforated case 23, a fiber filter media 25, a piston rod 251, a cylinder 252, a compression bar 27, a support bar 271, and a support string 270. A filtered water collecting tank 100 of the filter tank 10 comprises a discharging pipe 140 and a drainage check valve 110. And a guiding groove 130 to which a sliding connection means 235 formed on a side of the unit filter 20 is connected is formed on the inside of both sides of the filter tank 10.

As shown in the FIG. 1, the filter tank 10 of the present invention is formed in order to block a portion of the continuous water flow and be disposed in the water.

The distinctive features of filter tank 10 are an inflow part through which a raw water to be filtered flows in and a discharge part through which a filtered water discharges. An influent inlet 11, which lets the raw water flow in through a check valve 12, is formed in a side of an upper portion of the filter tank 10 and the filtered water collecting tank 100 is formed in a lower portion of the filter tank 10 in order that a water flow may be generated by gravity. (More specifically, the water flow is generated due to the difference of the water level.)

The unit filter 20 is a filtering part disposed in the filter tank 10.

As shown in the FIGS. 2 and 3, the unit filter 20 comprises a perforated case 23, a fiber filter media 25, a piston rod 251, and a cylinder 252, more specifically, the perforated case 23 is a broad board shape structure, in the side of which a perforated surface is formed and in the bottom of which at least one filtered water outlet 230 is formed.

The perforated case 23 is not confined to the structure of a board shape. The perforated case 23 may be formed in a cylindrical shape having small capacity.

As shown in the FIG. 4, the perforated surface is a broad side of the perforated case 23 and has at least one filtered water inflow hole 239. It is more desirable to form a plurality of filtered water inflow holes 239 arranged densely. And after the raw water is filtered by the fiber filter media 25, the raw water flows into the perforated case 23 through the filtered water inflow holes 239 of both sides of the perforated case 23 and then is discharged through the filtered water outlet 230.

The fiber filter media 25 is a plurality of bundles of fiber which are disposed densely on both sides of the perforated case 23.

The lower portion of each fiber filter media 25 is connected and fixed to a lower filter media holder 28 connected to a lower portion of the perforated case 23 to form a fixed end, and the upper portion of each fiber filter media 25 is connected to an upper filter media holder 250 disposed horizontally and separately above the perforated case 23 to form a free end.

That is, the upper filter media holder 250 is an independent and separate holder, in which hanging means that can hang the fiber filter media 25 are disposed continuously and horizontally above the perforated case 23.

The piston rod 251 is connected to the upper filter media holder 250, and the cylinder 252 controls the ascent and descent of the upper filter media holder 250 by operating the piston rod 251, so that the size of pores of the fiber filter media 25 is controlled when filtering and backwashing is performed.

That is, the fiber filter media 25 is disposed in close contact with both sides of the perforated case 23 on which the filtered water inflow holes 239 are formed, and the lower portion of the fiber filter media 25 forms a fixed end and the upper portion of the fiber filter media 25 forms a free end against the perforated case 23, thus the tention of the fiber filter media 25 is controlled, i.e., the size of pores of the fiber filter media 25 is controlled, by the operation of ascending and descending of the free end.

Meanwhile, As shown in the FIGS. 3, 5 and 6, the unit filter 20 further comprises a compression bar 27, a support bar 271 and a support string 270, more specifically, the compression bar 27 is disposed on the outside of the middle of the fiber filter media 25 across the fiber filter media 25 and is connected with the support string 270.

The support bar 271 is connected to the perforated case 23 of the unit filter 20 and supports the tension of the support string 270.

The support string 270 is connection line connecting the upper filter media holder 250 and the compression bar 27, and the operation of ascending and descending of the cylinder 252 is transferred to the compression bar 27 due to the support string 270 so that the fiber filter media 25 is tightened or loosened.

The support string 270 may be guided from the inside of the perforated case 23 and be extended to the upper filter media holder 250. Or, as shown in the FIG. 5, the support bars 271 may be formed inside and outside of the perforated case 23 respectively, and the support string 270 connected to the compression bar 27 is supported by an inner support bar, and then the support string 270 is guided to an outer support bar and extended to the upper filter media holder 250. Or, as shown in the FIG. 6, the support string 270 may be extended along the outside of the perforated case 23. Various modifications as well as above mentioned embodiments may be possible.

According to the above embodiments, the movement of ascending and descending of the upper filter media holder 250 due to the cylinder 252 is transferred by the support string 270, and thus the support string 270 supported by the support bar 271 presses the compression bar 27 onto the perforated case 23 or loosens the compression bar 27.

That is, the motion of tightening or loosening the fiber filter media 25, which is performed by the compression bar 27, prevents reduction of pressing force applied to the middle portion of the fiber filter media 25, which is due to the extension of the length of the fiber filter media 25, so that the size of the pore can be controlled successfully also in the middle portion of the fiber filter media 25.

Meanwhile, the filtered water outlet 230 formed on the bottom of the perforated case 23 is connected to or separated from a filtered water collecting tank 100 of the filter tank 10 by the operation of ascending or descending of a lifting device (not shown in the figure).

As shown in the FIG. 7, a guiding groove 130 is formed on insides of both sides of the filter tank 10, and a sliding connection means 235 which is formed on both narrow sides of the perforated case 23 and slides along the guiding groove 130. Accordingly, the operation of ascending and descending of the unit filter 20 by the lifting device (not shown in the figure) is guided by the guiding groove 130, so that, as shown in the FIGS. 1 and 8, the filtered water outlet 230 formed on the bottom of the unit filter 20 is connected to or separated from the filtered water collecting tank 100 of the filter tank 10.

Meanwhile, the filtered water collecting tank 100 of the filter tank 10 of the present invention has a discharging pipe 140 and a discharging guide 101. The filtered water outlet 230 of the unit filter 20 is guided into the discharging guide 101 disposed at the bottom of the filter tank 10.

The discharging guide 101 and the filtered water outlet 230 are formed in a cylindrical or a square pillar shape with a certain length, and the filtered water outlet 230 is inserted into or separated from the discharging guide 101 depending on the operation of the cylinder 252.

The filtered water collecting tank 100 is a chamber, in which the filtered water filtered in the unit filter is collected, and to which a certain pressure is applied due to the filtered water that flows in.

The discharging pipe 140 is a pipe connecting the filtered water collecting tank 100 and outside water tank 300.

The filtered water gathered in the filtered water collecting tank 100 is discharged to the outside water tank 300 by the pressure of the interior and the gravity due to the difference of the water level.

Meanwhile, a drainage check valve 110 is formed in the lower portion of the discharging guide 101 of the filtered water collecting tank 100. While filtering and backwashing, as shown in the FIG. 8, the flow of the filtered water between the inside of the unit filter 20 and the filtered water collecting tank 100 is formed. And when the unit filter 20 is lifted in order to repair, as shown in the FIG. 9, the flow of the filtered water between the inside of the unit filter 20 and the filtered water collecting tank 100 is blocked.

The drainage check valve 110 comprises a stopper 111 inserted into or separated from the discharging guide 101 due to the elasticity of an elastic body 112 (for example, a spring). When the unit filter 20 is connected to the filtered water collecting tank 100, the unit filter 20 contacts closely to the stopper 111 and descends by the weight of the unit filter 20, and when the unit filter 20 ascends and is separated from filter tank 10 by the cylinder, the stopper 111 ascends by the elasticity of an elastic body 112 and blocks the inflow of the filtered water.

At least one hole 113 is formed on the outer surface of the stopper 111 of the drainage check valve 110. Thus, as shown in the FIGS. 8 and 9, when the unit filter 20 descends, the water flows through the hole 113 between the inside of the unit filter 20 and the filtered water collecting tank 100, and when the unit filter 20 ascends, the discharging guide 101 is blocked.

As shown in the FIGS. 1 and 10, the filtered water collecting tank 100 comprises the discharging pipe 140 extended from the filtered water collecting tank 100 to the outside of the filter tank 10 and extended in the upper direction. But the discharging pipe 140 is extended to the lower position than the influent inlet 11 of the filter tank 10.

Thus, as shown in the FIG. 10, the raw water flowing into the filter tank 10 is filtered while the water level rises up to the height of the influent inlet 11. (The height of the influent inlet 11 is hereinafter referred to as Water Level 1, i.e., WL1)

Therefore the height of the influent inlet 11 (WL1) would be the normal filtration water level.

The sensor 30 of the present invention is a sensor detecting the water level.

If the filtering process is continuously performed, the suspended solids are accumulated in the unit filter 20, so that the filtering resistance is increased. Accordingly, the water level also rises.

Because the water level of the filter tank 10 rises depending on the progress of the filtration, the rise of the water level indicates the degree of blockage of the unit filter 20.

Therefore, if the water level rises to a certain height, it is needed to wash the unit filter 20. Accordingly, a certain water level may be predetermined, and if the water level rises to the predetermined water level, washing the unit filter 20 may be performed. (The hpredetermined water level is hereinafter referred to as Water Level 2, i.e., WL2)

The WL2 may be determined variably according to the requirement of washing.

Meanwhile, if the WL2 is equal to or higher than the influent inlet 11, the water in the filter tank 10 flows backward. Accordingly, a check valve 12 is formed in the influent inlet 11 in order to prevent water from flowing backward.

The WL2 may be determined variably according to the requirement of washing, but, as shown in the FIG. 10, it is desirable that the WL2 is equal to the height of the upper portion of the influent inlet 11, which is the water level that the raw water flows in no more. And the filtration time is determined depending on the height corresponding to WL2−WL1.

Hereinafter, the backwash process will be described with reference to the FIG. 1.

The sensor 30 detects WL2 and generates a control signal. A backwash process begins depending on the control signal of the sensor 30. The backwash process is performed by the backwash air flowing in through the air inflow pipe 40, and the backwash water flowing backward in from the filtered water collecting tank 100.

More specifically, the air inflow pipe 40 comprises an air pipe 45 extended from outside to a lower portion of the filter tank 10, and an air pump and a valve 41 supplying air to the air inflow pipe 40 through the air pipe 45. And according to the control signal of the sensor 30, the backwash air flows in from the bottom of the filter tank 10.

The air inflow pipe 40 is a chamber at which holes are formed in order that the air may jet out to the unit filter 20.

The air jetting out from the air inflow pipe 40 generates bubbles in the lower portion of the filter tank 10 and thus rise the backwash water. Accordingly, the vibration of the bubbles generated by he backwash air shakes the suspended solids blocking the pores of the fiber filter media 25 off the fiber filter media 25 of the unit filter 20.

A control means 50 is formed in a side of the filtered water collecting tank 100 and controls the inflow of the backwash water according to the control signal of the sensor 30. If the backwash water flows in due to the operation of the control means 50, the backwash water transfers the suspended solids shaken off by the vibration of the bubbles upward, and rises the water level.

As the examples of the control means, the natural backflow control by the outside water tank 300 connected to the filtered water collecting tank 100 and the pump 150 operated by the control signal and assisting the inflow of the backwash water may be used.

The natural backflow control means that if the outside water tank 300 is connected to the filter tank 10 and the backwash water flows in, the water in the outside water tank 300 flows backward so that the water level of the filter tank 10 rises.

When the backflow force is insufficient, the pump 150 may be used.

In the backwash process of the present invention, the suspended solids are transferred upward and discharged.

In order to increase the efficiency of discharge, the backwash water discharging pipe 60 is not confined to a pipe, but the watercourse also may be considered as the backwash water discharging pipe 60.

Meanwhile, the kind of suspended solids flowing into the filter tank 10 is various. Therefore, light suspended solids may be risen by the backwash water and air, but heavy suspended solids or organic suspended solids having viscosity, etc. may sink downward.

Accordingly, before backwash process begins, the deposited suspended solids are discharged through the air inflow pipe 40 formed at the bottom of the filter tank 10, and thus it is desirable that the air inflow pipe 40 is formed to open and shut the inflow path of the air and discharging path of the suspended solids selectively.

In summary, the pore size of the fiber filter media 25 of the unit filter 20 is controlled by the cylinder 252 and the piston rod 251.

That is, the fiber filter media 25 is connected to the upper filter media holder 28 connected with the piston rod 251, and thus the pore size of the fiber filter media 25 is controlled by the operation of ascent and descent of the cylinder 252 formed in the upper portion of the outside of the filter tank 10.

The cylinder 252 is operated by the control signal of the sensor 30, when the water level is at the normal filtration water level WL1, the cylinder 252 ascends so that the pore size of the fiber filter media 25 decreases, and when the water level is at WL2, the cylinder 252 descends so that the pore size of the fiber filter media 25 increases.

The present invention stated above can be used by blocking and being disposed in a portion of the watercourse.

According to the present invention, when a unit filter needs to be repairing, the unit filter is lifted up by the lifting device and repaired. When one unit filter is repaired, the filtration and backwash process are performed continuously by the other unit filters.

The disclosed by the drawings are only the preferred embodiments to implement the gravity fiber filter according to the present invention.

It will be understood by those skilled in the art that various changes in form and details may be made therein without departing from the spirit and scope of the invention as defined by the appended claims.

The invention claimed is:

1. A gravity fiber filter, comprising:
   a filter tank placed in a portion of a large amount of running water, and comprising:
      an influent inlet formed in a side of an upper portion of the filter tank and letting raw water flow in through a check valve;
      a filtered water collecting tank formed in a lower portion of the filter tank and collecting filtered water; and
      a backwash water outlet formed in a higher position than the influent inlet;
   at least one unit filter filtering the raw water which flows into the filter tank, and comprising
      a perforated case which has a board shape structure having a cavity inside and having at least one filtered water outlet protruding from a bottom of the perforated case, and on both sides of which at least one filtered water inflow hole is formed, wherein the perforated case is joined to or separated from the filter tank by joining the filtered water outlet to the filtered water collecting tank or separating the filtered water outlet from the filtered water collecting tank of the filter tank;
      a fiber filter media being a plurality of bundles of fiber, which are arranged densely on both sides of the perforated case, each lower portion of which is connected and fixed to a lower filter media holder connected to a lower portion of the perforated case, and each upper portion of which is connected to an upper filter media holder placed horizontally and separately above the perforated case;
      a piston rod connected to the upper filter media holder;
      a cylinder, which controls the ascent and descent of the upper filter media holder by operating the piston rod so that the size of pores of the fiber filter media is controlled when filtering and backwashing is performed;
      a compression bar disposed horizontally on an outside of the fiber filter media;
      a support bar disposed horizontally on both sides of the perforated case; and
      a support string supported by the support bar and connecting the compression bar with the upper filter media holders;
   a sensor detecting a water level in the filter tank and then generating a control signal;
   an air inflow pipe extended from outside to a bottom portion of the filter tank, so that a backwash air is provided for the unit filter through the air inflow pipe depending on the control signal of the sensor;
   a control means controlling performing a filtration process, in which the raw water flowing into the water tank is filtered by the unit filter and then discharged into the filtered water collecting tank depending on the control signal of the sensor, and performing a backwash process, in which a backwash air and a backwash water flows into the filter tank simultaneously or sequentially; and
   a backwash water discharging pipe connected to the backwash water outlet of the filter tank and discharging suspended solids, which are gathered at an upper portion of the filter tank by the operation of the backwash water and the vibration of the backwash air bubbles, to outside, wherein when the upper filter media holder ascends or descends by the operation of the cylinder, the compression bar tightens or loosens the fiber filter media, so that the pore size of the fiber filter media is controlled successfully in a middle portion of the fiber filter media as well as in both end portions of the fiber filter media.

2. The gravity fiber filter according to claim 1, wherein the filtered water collecting tank comprises:
at least one discharging guide which is a guiding pipe formed in an upper portion of the filtered water collecting tank, the filtered water outlet of the unit filter guided into the discharging guide; and
a discharging pipe connected to a side of the filtered water collecting tank and guiding the collected filtered water to an outside water tank.

3. The gravity fiber filter according to claim 2, wherein the filtered water collecting tank further comprises:
a drainage check valve which has a cylindrical shape, on an outer surface of which at least one hole is formed, and which enters and coming out of the discharging guide by elasticity of an elastic body,
wherein when the unit filter is combined, the unit filter descends and contacts closely to the filtered water collecting tank by the weight of the unit filter so that the filtered water is discharged into the filtered water collecting tank through the hole formed on an outer surface of the drainage check valve, and when the unit filter ascends and is separated by the cylinder, the drainage check valve ascends by the elasticity of an elastic body and inserted into the discharging guide so that the drainage check valve blocks the discharging guide.

4. The gravity fiber filter according to claim 1, further comprises:
a guiding groove formed on an inside of both sides of the filter tank; and
a sliding connection means which is formed on both narrow sides of the unit filter and slides along the guiding groove,
wherein the operation of an ascending and descending of the unit filter is performed along the guiding groove so that the filtered water outlet formed on a bottom of the unit filter is connected perfectly to the filtered water collecting tank.

* * * * *